No. 840,576. PATENTED JAN. 8, 1907.
F. D. MILLARD.
TURBINE.
APPLICATION FILED JULY 12, 1906.
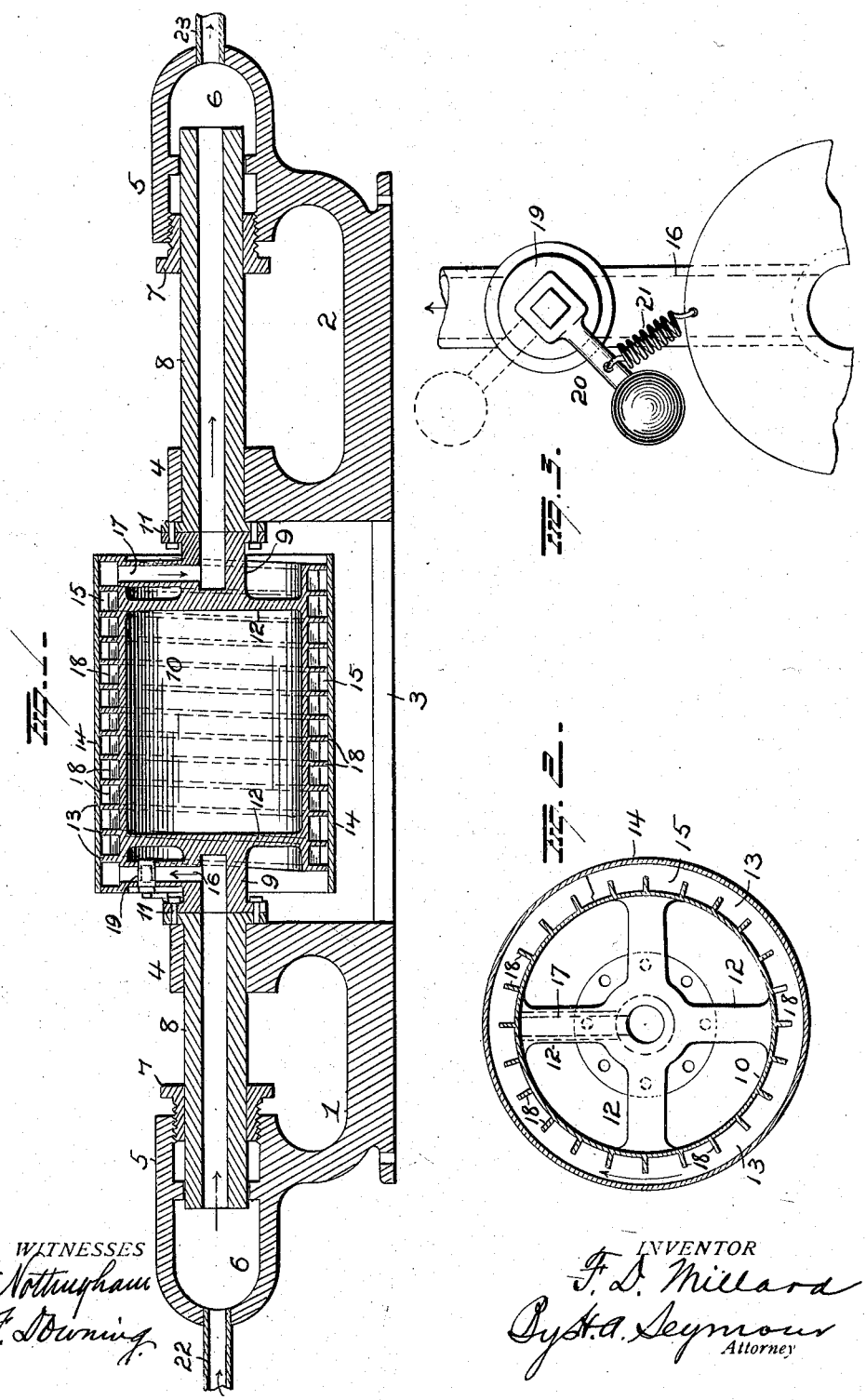
WITNESSES
INVENTOR
F. D. Millard
By H. A. Seymour
Attorney

UNITED STATES PATENT OFFICE.

FRED D. MILLARD, OF BURLINGTON, IOWA.

TURBINE.

No. 840,576.   Specification of Letters Patent.   Patented Jan. 8, 1907.

Application filed July 12, 1906. Serial No. 325,858.

*To all whom it may concern:*

Be it known that I, FRED D. MILLARD, a resident of Burlington, in the county of Des Moines and State of Iowa, have invented certain new and useful Improvements in Turbines; and I do hereby declare the following to be a full, clear, and exact description of the invention, such as will enable others skilled in the art to which it appertains to make and use the same.

My invention relates to improvements in turbines, the object of the invention being to provide improvements of this character in which a cylinder or body is supported in improved mounting and provided with a circuitous spiral steam or other fluid passage around the cylinder, in which passage vanes or buckets are located to receive the impact of the fluid to revolve the cylinder or body, and also provide an improved governor-valve to control the speed of the turbine.

With these and other objects in view the invention consists in certain novel features of construction and combinations and arrangements of parts, as will be more fully hereinafter described, and pointed out in the claims.

In the accompanying drawings, Figure 1 is a view in longitudinal section illustrating my improvements. Fig. 2 is a view in cross-section on the line $x\ x$ thereof, and Fig. 3 is a fragmentary end elevation illustrating the governor.

1 and 2 represent the cast bed-frame of my improved turbine, which may or may not be connected by a plate or bar 3, as shown. These bed-frames are both made with alined bearings 4 and 5, respectively, the outer bearings 5 being formed in the ends of steam-chambers 6 and suitably packed by means of any movable packing, and a packing-nut 7 is screwed into the bearings 5. These bearings 4 and 5 support tubular shafts 8, having their inner ends flanged to be securely riveted or bolted to flanged ends of tubular stubs 9 at the opposite ends of the rotary element 10, as clearly shown at 11.

The rotary element 10 comprises a cast cylinder having radial arms or spiders 12 in its ends connecting the cylinder with stubs 9, and the cylinder is made with an annular spiral flange 13, extending a number of times around the cylinder and from end to end thereof. A cylindrical outer casing 14 is shrunk onto this spiral flange 13 and constitutes the outer wall of the continuous spiral passage 15, formed by the flange 13 and cylinder 10.

The inlet end of the spiral passage 15 is connected by a short inlet duct or tube 16 with tubular stub 9 at this end, and the outlet end of the passage at the other end of the cylinder is connected by a duct or tube 17 with the other tubular stub 9.

The cylinder 10 between the convolutions of flange 13 is provided with vanes or buckets 18 to receive the impact of the motive fluid, and these vanes or buckets may be of various shapes and sizes, and I do not restrict myself in this particular.

In the inlet-tube 16 a rotary valve or cock 19 is located and is provided with a weighted arm 20 on its outer end, connected by a coiled spring 21 with stub 9 and constituting a governor, as it will be seen, the centrifugal action of the rapidly-revolving cylinder will tend to throw the arm 20 outward against the action of spring 21 and close or partially close valve 19, thus regulating the flow of fluid to the rotary element, and hence govern the speed of the turbine.

The inlet-pipe 22 communicates with the chamber 6 at one end of the engine, and an exhaust-pipe 23 communicates with the chamber 6 at the other end.

The operation of my improvements is as follows: Steam or other motive fluid from pipe 22 enters chamber 6 at this end of the engine, flows through shaft 8, stub 9, and tube 16 into passage 15, and thence passes through the passage 15 around and around the rotary element 10 and transmits motion to the rotary element by reason of its frictional contact and the resistance afforded by the buckets or vanes 18 to revolve the rotary element at high speed, the governor-valve 19 serving to regulate the flow of motive fluid and consequent speed of the turbine, as above explained. The fluid escapes from the end of passage 15 through tube 17, stub 9, shaft 8, and chamber 6 into pipe 23, and the flow of fluid is continuous, save when stopped or retarded by the governor.

A pulley may be secured on one of the shafts 8 to take off power, and a great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a turbine, the combination with a rotary element having an annular spiral fluid-passage, shafts supporting opposite ends of the rotary element, ducts or tubes in the rotary member communicating respectively with the ends of the fluid-passage, means for admitting motive fluid to one of said tubes or ducts, means for permitting exhaust of fluid from the other duct or tube, a valve in the inlet duct or tube and a governor carried by the rotary member and controlling said valve.

2. In a turbine, the combination with a rotary element having an annular spiral fluid-passage, of hollow shafts supporting opposite ends of said rotary element, tubes connecting the respective ends of the fluid-passage with the hollow shafts, a governor-valve in one of said tubes, and an inlet-chamber inclosing one end of one of said shafts and an exhaust-chamber inclosing the end of the other shaft.

3. In a turbine, the combination with a rotary element having an annular spiral fluid-passage, of hollow shafts supporting opposite ends of the rotary element and communicating with the respective ends of the fluid-passage, a fluid-inlet chamber inclosing one end of one shaft and provided with a bearing therefor, a fluid-outlet or exhaust chamber inclosing the end of the other shaft and provided with a shaft therefor, and vanes or buckets in the spiral fluid-passage.

4. A turbine comprising a cylinder having an annular spiral flange, a cylindrical casing shrunk onto said flange and forming a spiral fluid-passage, buckets or vanes in said passage, tubular stubs at the ends of the cylinder, and tubes connecting said stubs with the respective ends of the passage.

In testimony whereof I have signed this specification in the presence of two subscribing witnesses.

FRED D. MILLARD.

Witnesses:
CHAS. C. CLARK,
JNO. J. SEERLEY.